United States Patent
Shigaki et al.

(10) Patent No.: US 10,412,564 B2
(45) Date of Patent: *Sep. 10, 2019

(54) APPARATUS, METHOD, AND SYSTEM FOR DISPLAYING ANTENNA LOCATION OF COMMUNICATION TERMINAL, AND RECORDING MEDIUM

(71) Applicant: Ricoh Company, Ltd., Tokyo (JP)

(72) Inventors: Keizoh Shigaki, Kanagawa (JP); Yuuichiroh Tsujiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 98 days.

This patent is subject to a terminal disclaimer.

(21) Appl. No.: 15/361,285

(22) Filed: Nov. 25, 2016

(65) Prior Publication Data

US 2017/0156024 A1 Jun. 1, 2017

(30) Foreign Application Priority Data

Nov. 27, 2015 (JP) .................. 2015-231357
Nov. 17, 2016 (JP) .................. 2016-223821

(51) Int. Cl.
*H04W 4/80* (2018.01)
*H04B 5/00* (2006.01)
*H04L 29/08* (2006.01)

(52) U.S. Cl.
CPC ............ *H04W 4/80* (2018.02); *H04B 5/0031* (2013.01); *H04L 67/36* (2013.01)

(58) Field of Classification Search
CPC ...... H04W 4/80; H04W 4/008; H04B 5/0031; H04L 67/10; H04L 67/36

USPC ........................................................ 455/41.1
See application file for complete search history.

(56) References Cited

U.S. PATENT DOCUMENTS

| | | | | |
|---|---|---|---|---|
| 2013/0281014 | A1* | 10/2013 | Frankland | H04B 5/00 455/41.1 |
| 2014/0007019 | A1* | 1/2014 | Saukko | G06F 3/0484 715/863 |
| 2014/0087654 | A1* | 3/2014 | Kiveisha | H04B 5/0031 455/41.1 |

(Continued)

FOREIGN PATENT DOCUMENTS

| | | |
|---|---|---|
| JP | 2015-064857 | 4/2015 |
| JP | 2015-103834 | 6/2015 |

(Continued)

*Primary Examiner* — Raymond S Dean
(74) *Attorney, Agent, or Firm* — Oblon, McClelland, Maier & Neustadt, L.L.P.

(57) ABSTRACT

An apparatus, system, and method for displaying an antenna location of a communication terminal, receives, from a user carrying and operating the communication terminal, an instruction that causes the communication terminal to establish a non-contact communication with a counterpart communication device via an antenna provided in the communication terminal, and controls a display of the communication terminal to display location guide information indicating a location of the antenna in the communication terminal, the location guide information to be used for assisting the user in identifying a section of the communication terminal to be brought closer to the counterpart communication device to start establishing the non-contact communication with the counterpart communication device.

14 Claims, 15 Drawing Sheets

(56) References Cited

U.S. PATENT DOCUMENTS

| | | | |
|---|---|---|---|
| 2015/0163765 A1* | 6/2015 | Hobbs | H04W 4/21 |
| | | | 455/41.2 |
| 2015/0280773 A1* | 10/2015 | Chang | H04B 1/44 |
| | | | 455/78 |
| 2016/0127600 A1* | 5/2016 | Beatty | H04N 1/327 |
| | | | 358/1.15 |
| 2016/0218426 A1* | 7/2016 | Kelly | H01Q 3/24 |
| 2017/0111943 A1* | 4/2017 | Kersjes | H04W 72/046 |

FOREIGN PATENT DOCUMENTS

| | | | |
|---|---|---|---|
| JP | 2015115775 A | * | 6/2015 |
| JP | 2015-184917 | | 10/2015 |

* cited by examiner

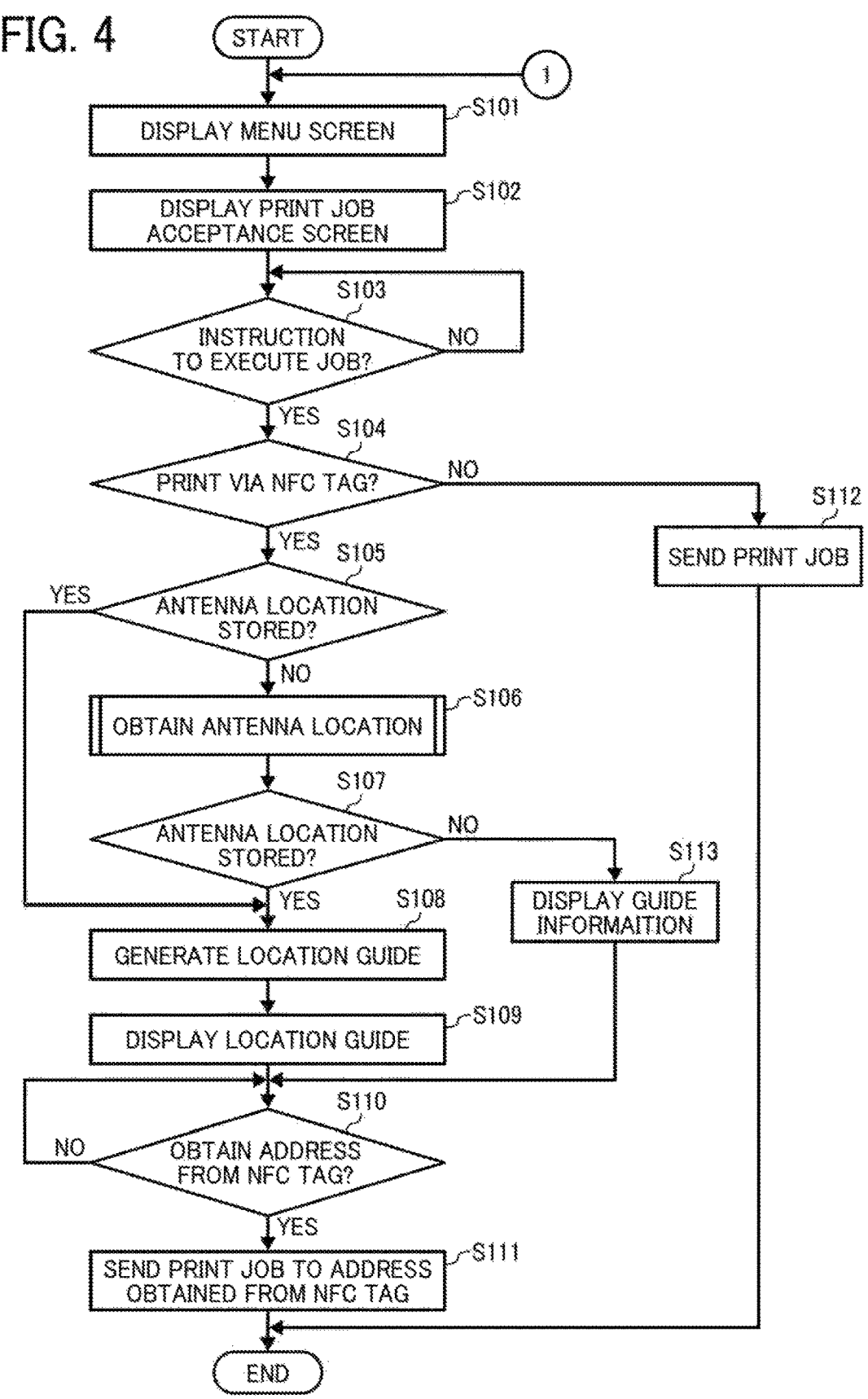

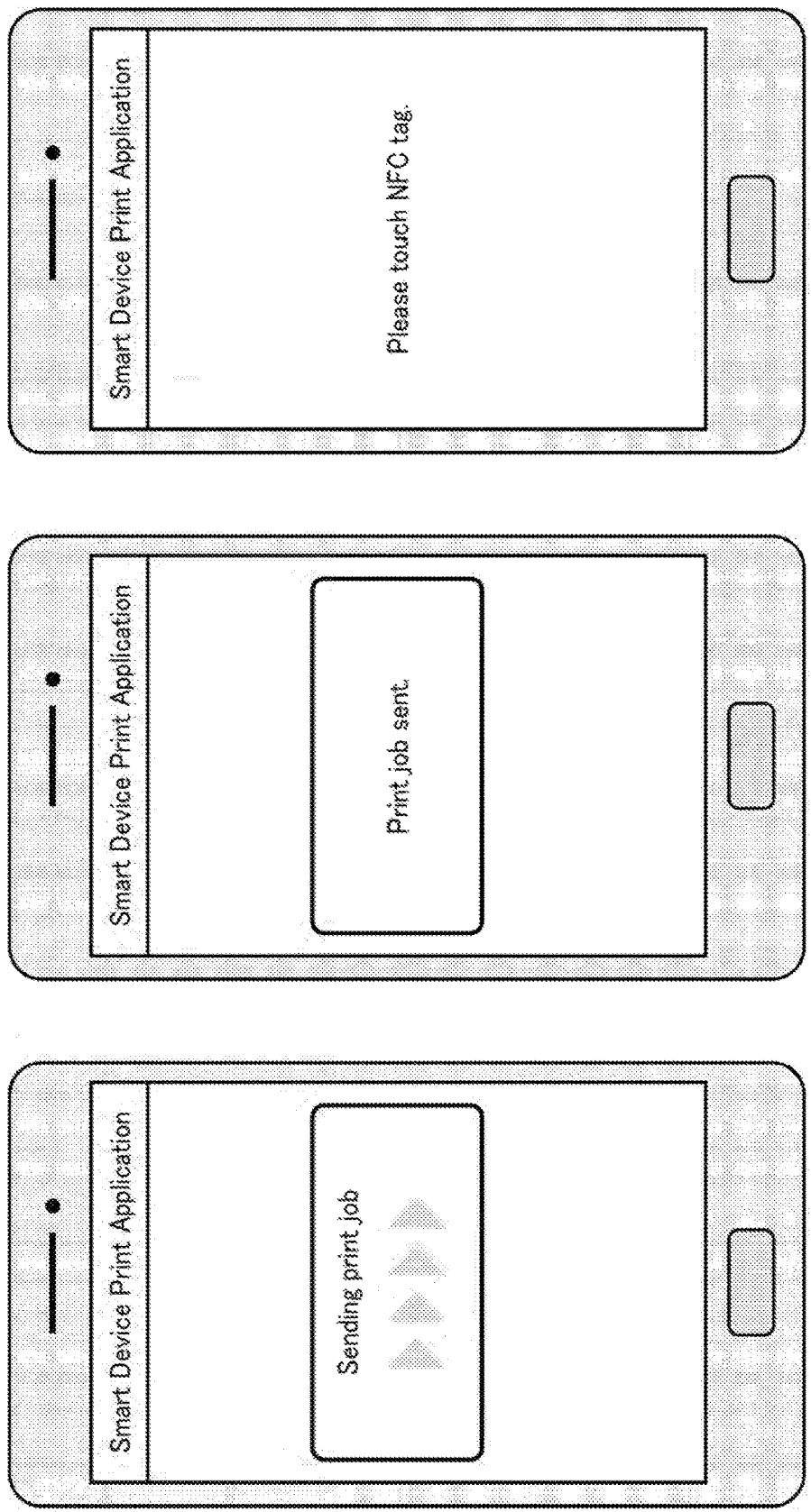

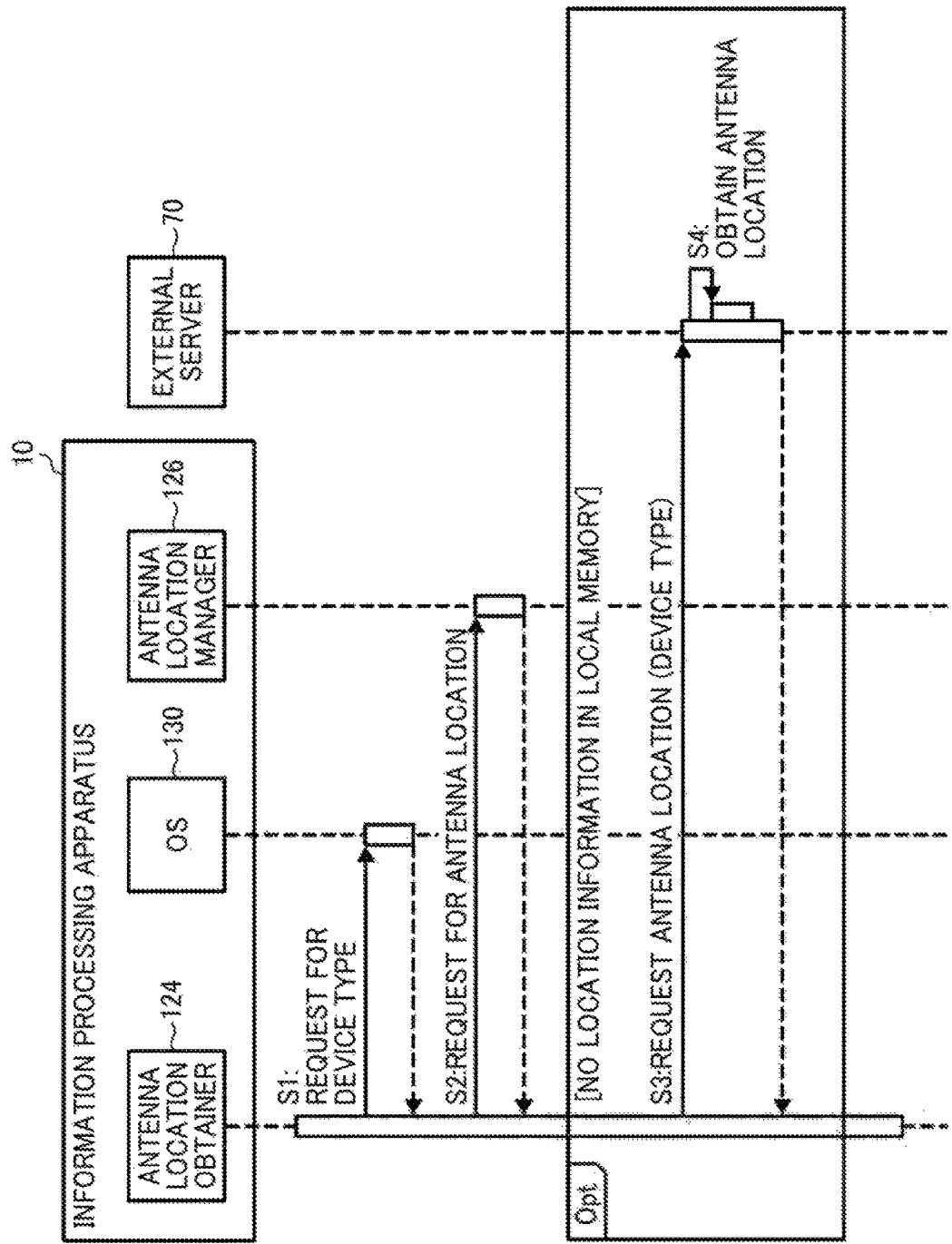

ANTENNA LOCATION:[0]

ANTENNA LOCATION:[1]

ANTENNA LOCATION:[2]

ANTENNA LOCATION:[3]

ANTENNA LOCATION:[4]

ANTENNA LOCATION:[5]

APPARATUS, METHOD, AND SYSTEM FOR DISPLAYING ANTENNA LOCATION OF COMMUNICATION TERMINAL, AND RECORDING MEDIUM

CROSS-REFERENCE TO RELATED APPLICATIONS

This patent application is based on and claims priority pursuant to 35 U.S.C. § 119(a) to Japanese Patent Application Nos. 2015-231357, filed on Nov. 27, 2015, and 2016-223821, filed on Nov. 17, 2016, in the Japan Patent Office, the entire disclosure of which is hereby incorporated by reference herein.

BACKGROUND

Technical Field

The present invention generally relates to an apparatus, method, and system for displaying an antenna location of a communication terminal, and a recording medium.

Description of the Related Art

The recent mobile terminals such as smart phones and tablet personal computers (PCs) are capable of establishing non-contact communication based on, for example, near field communication (NFC). For example, such mobile terminal with the NFC function reads connection information to be used for establishing a wireless communication with a communication device, from a programmable NFC tag attached to the communication device. Using the read connection information, the mobile terminal establishes a wireless communication with the communication device, to perform various operation in cooperation with the communication device.

SUMMARY

Example embodiments of the present invention include an apparatus, system, and a method for displaying an antenna location of a communication terminal, which receives, from a user carrying and operating the communication terminal, which causes the communication terminal to establish a non-contact communication with a counterpart communication device via an antenna provided in the communication terminal, and controls a display of the communication terminal to display location guide information indicating a location of the antenna in the communication terminal. The location guide information is to be used for assisting the user in identifying a section of the communication terminal to be brought closer to the counterpart communication device to start establishing the non-contact communication with the counterpart communication device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a flowchart illustrating operation of processing a print job, performed by the information processing apparatus of FIG. 1, according to an embodiment of the present invention;

FIGS. 5A to 5F are an illustration of example screens displayed at the information processing apparatus according to printer application;

FIG. 9 is a data sequence diagram illustrating operation of obtaining antenna location information, performed by the information processing apparatus in cooperation with an external server, according to an embodiment of the present invention;

Figure 1:
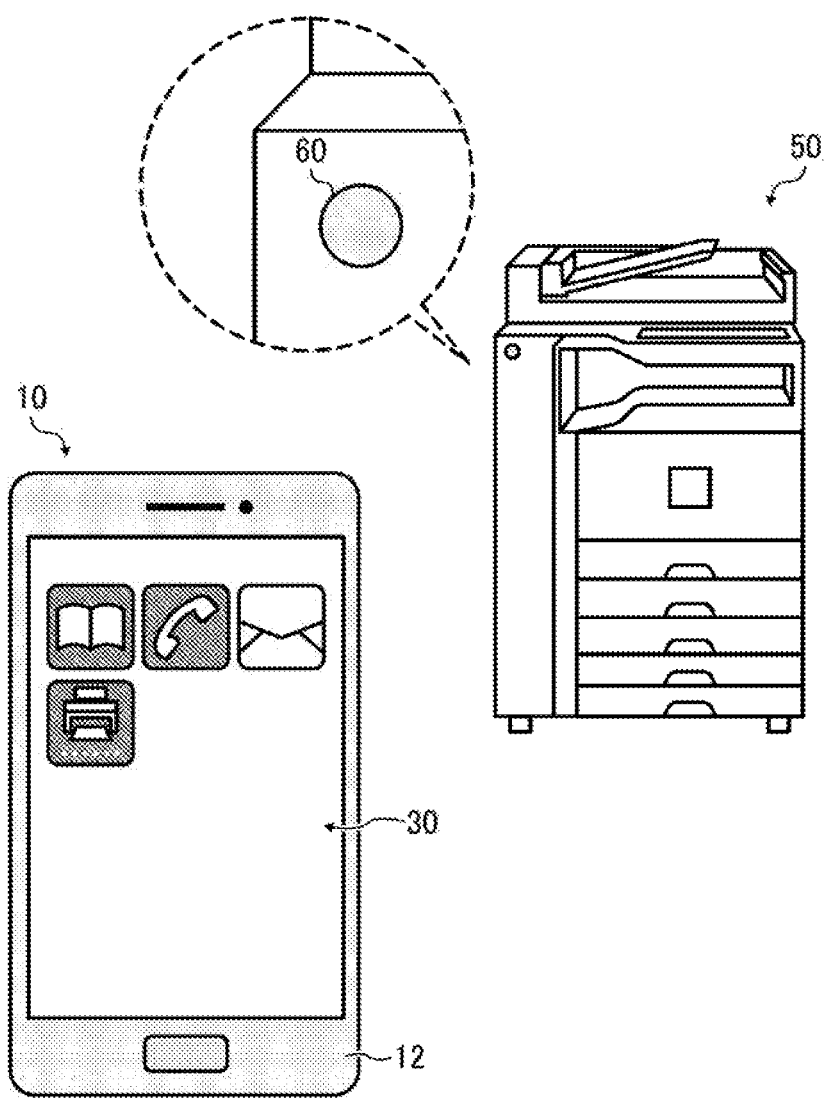
FIG. 1 is an external view illustrating an information processing apparatus according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 is an external view illustrating an information processing apparatus 10 according to an embodiment of the present invention. The information processing apparatus 10 is a portable information processing apparatus capable of wirelessly communicating using, for example, near field communication (NFC).

As described below, in one example operation, the information processing apparatus 10 sends a request for printing to a printer 50, through performing non-contact type communication. The information processing apparatus 10 is also capable of communicating with an external server 70 (FIG. 2) via a network such as the Internet or a local area network (LAN). The external server 70 is a general-purpose computer, which includes a processor, a memory, and a network interface.

The information processing apparatus 10 is provided with a display 30, which is attached on a surface of a body 12 of the information processing apparatus 10. As illustrated in FIG. 1, the information processing apparatus 10 in this embodiment is implemented by a smart phone. Alternatively, the information processing apparatus 10 may be implemented by any other desired apparatus with a non-contact type communication function and a display function, such as a tablet personal computer (PC). For simplicity, in this embodiment, the information processing apparatus 10 is referred to as the smart phone 10.

Figure 2:
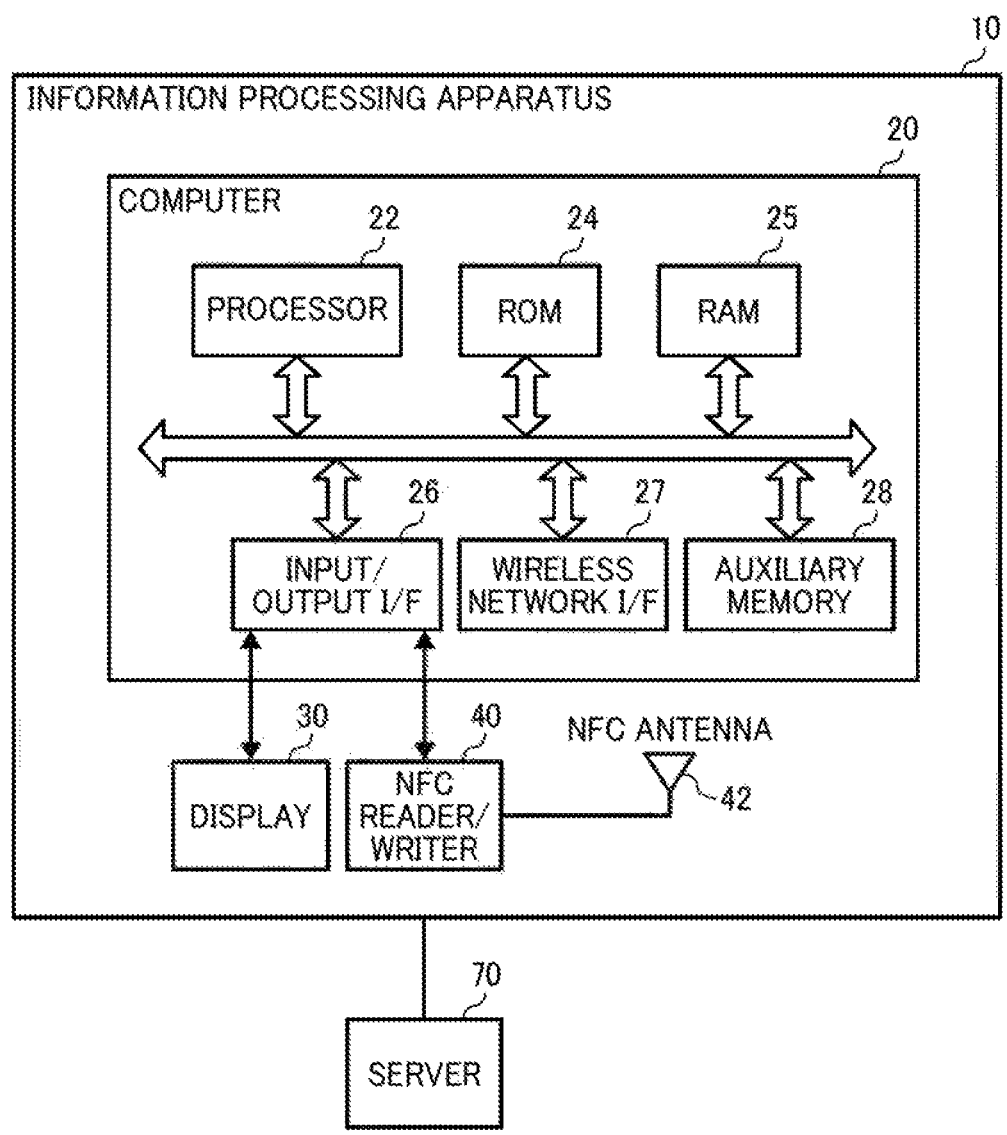
FIG. 2 is a schematic block diagram illustrating a hardware configuration of the information processing apparatus of FIG. 1.

Referring to FIG. 2, a hardware configuration of a computer 20 in the smart phone 10 is described according to the embodiment. The computer 20 of the smart phone 10 mainly includes a processor 22, a read only memory (ROM) 24, a random access memory (RAM) 25, an input-output interface 26, a wireless network interface 27, and an auxiliary memory 28.

The processor 22 controls entire operation of the smart phone 10. The ROM 24 stores such as a boot program and firmware. The RAM 25 works as a working area for the processor 22 to execute the program. The input/output interface 26 connects the computer 20 with the display 30. The wireless network interface 27 connects the computer 20 with a near-range wireless network such as Wi-Fi or Bluetooth, or a mobile network such as 3G or LTE. The auxiliary memory 28 stores such as an operating system (OS 130) and application programs.

The smart phone 10 further includes a NFC reader/writer 40, which may be implemented by a circuit connected to a NFC antenna 42 provided in the smart phone 10 to communicate with the NFC antenna 42. The NFC reader/writer 40 is also connected with the computer 20 through the input/output interface 26 to communicate with the computer 20. The NFC antenna 42 is a non-contact communication antenna capable of transmitting or receiving high-frequency signals with a counterpart NFC module.

Now, application programs that are installed onto the computer 20 of the smart phone 10 are described.

The smart phone 10 is installed with a printing application program ("printer application"), which controls a printer to execute a print job via a wireless network. In this embodiment, the printer application installed on the smart phone 10 obtains address information of the printer that executes the print job, from an NFC standard, non-contact IC tag (NFC tag). For example, as illustrated in FIG. 1, it is assumed that the NFC tag 60 is attached to an exterior surface of the printer 50, which stores address information of the printer 50. In such case, as the smart phone 10 is brought closer to the printer 50, the smart phone 10 automatically sends the print job to the printer 50 identified with the address information obtained from the NFC tag, as a print job to be executed by the printer 50. Through this operation, the user at the smart phone 10 does not have to input address information, or any other information, which may be needed to start communicating with the printer 50.

According to the NFC standard, the NFC antenna 42 of the smart phone 10 should be made closer to the NFC tag 60 of the printer 50, by several centimeters or less. In bringing the smart phone 10 closer to the NFC tag 60, the user usually does not know a location of the NFC antenna 42 such that this operation of reading information from the NFC tag 60 has been cumbersome and time-consuming.

In view of this, the inventor of the present invention has realized that, if information indicating an antenna location of the smart phone 10 can be displayed to the user, the user can easily utilize such information to smoothly establish a communication between the smart phone 10 and the other apparatus.

In view of this, the printing application program is provided with a function of causing the display 30 of the smart phone 10 to display information indicating the antenna location of the smart phone 10.

Figure 3:
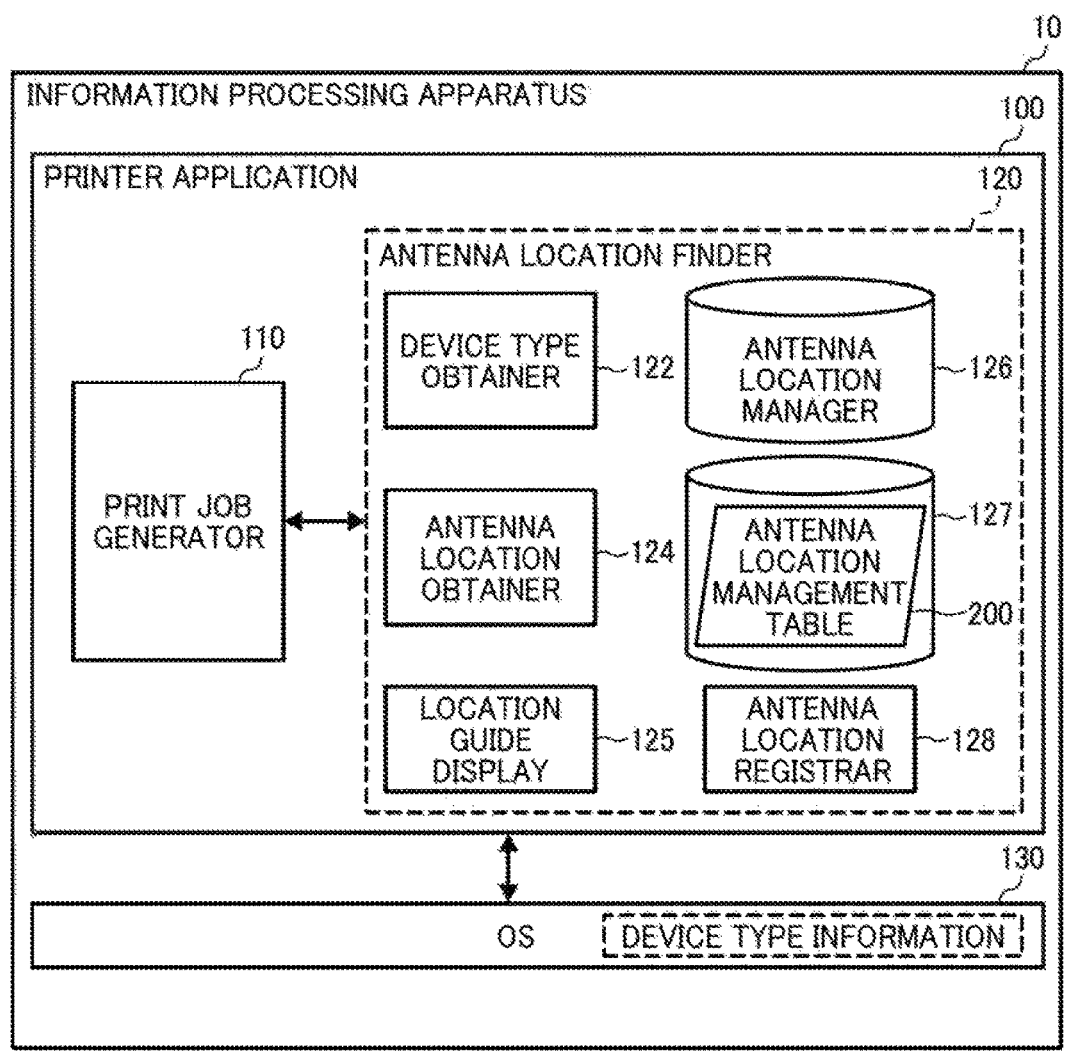
FIG. 3 is a schematic block diagram illustrating a functional configuration of the information processing apparatus of FIG. 1.

Referring now to FIG. 3, a functional configuration of the smart phone 10, having the computer 20 that is installed with the printer application 100, is described according to an embodiment of the present invention.

As illustrated in FIG. 3, with execution of the printer application 100, the smart phone 10 has a print job generator 110 and an antenna location finder 120.

The print job generator 110 receives a user selection of an electronic file to be printed, generates a print job that instructs printing of the selected file, and sends the print job to a destination designated by the user.

The antenna location finder 120 is a module to be called as needed by the print job generator 110, to provide user with useful information that assists the user in communicating with the printer 50 via the NFC tag. The antenna location finder 120 includes a device type obtainer 122, an antenna location obtainer 124, a location guide display 125, an antenna location manager 126, and an antenna location registrar 128.

The device type obtainer 122 obtains, from the OS 130 on the smart phone 10, information indicating a device type of the smart phone 10 (device type information).

The antenna location obtainer 124 obtains information indicating a location of the NFC antenna 42 in the smart phone 10, from the antenna location manager 126 or the external server 70, for example, using the device type information of the smart phone 10 that is obtained at the device type obtainer 122.

The antenna location obtainer 124 further stores the obtained antenna location of the smart phone 10 in a storage area 127, under control of the antenna location finder 120. The storage area 127 is any desired internal memory of the smart phone 10 such as the RAM 25.

The antenna location manager 126 associates, for each type of information processing apparatus with the NFC function (such as the smart phone 10 or a tablet PC), device type information of the information processing apparatus and antenna location information indicating a location of the NFC antenna in the information processing apparatus. More specifically, as described below referring to FIG. 7, the antenna location manager 126 manages such association information with an antenna location management table 200.

The location guide display 125 controls the display 30 to display, on a screen, a location of the NFC antenna 42 in the smart phone 10.

The antenna location registrar 128 registers an antenna location, which is input by a user for example, when the antenna location finder 120 fails to obtain the device type information of the smart phone 10 or the antenna location information corresponding to the device type information of the smart phone 10.

Referring now to FIG. 4, operation of processing a print job, performed by the smart phone 10, is described according to an embodiment of the present invention.

As the printer application 100 on the smart phone 10 is activated according to a user instruction, the print job generator 110 performs S101 to S104. For example, the user at the smart phone 10 may select the printer application 100, from the display 30, to activate the printer application 100.

Figure 5C:
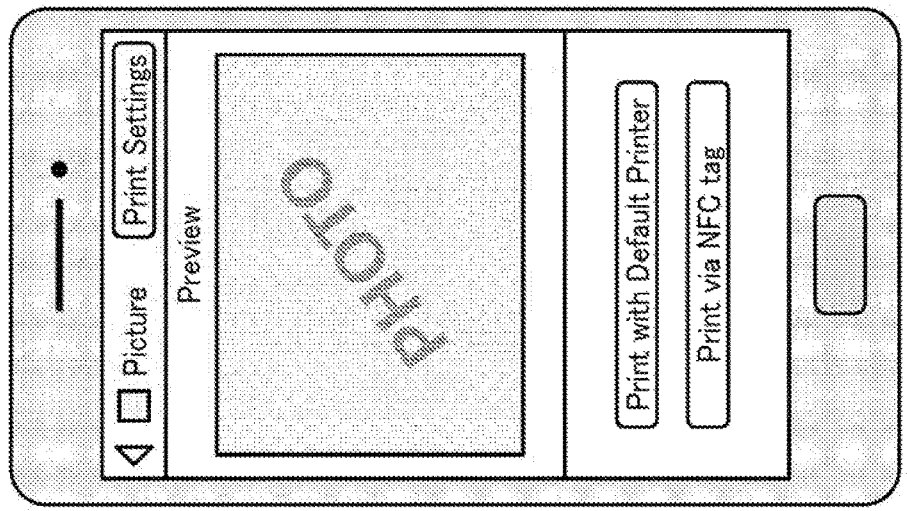
Figure 5B:
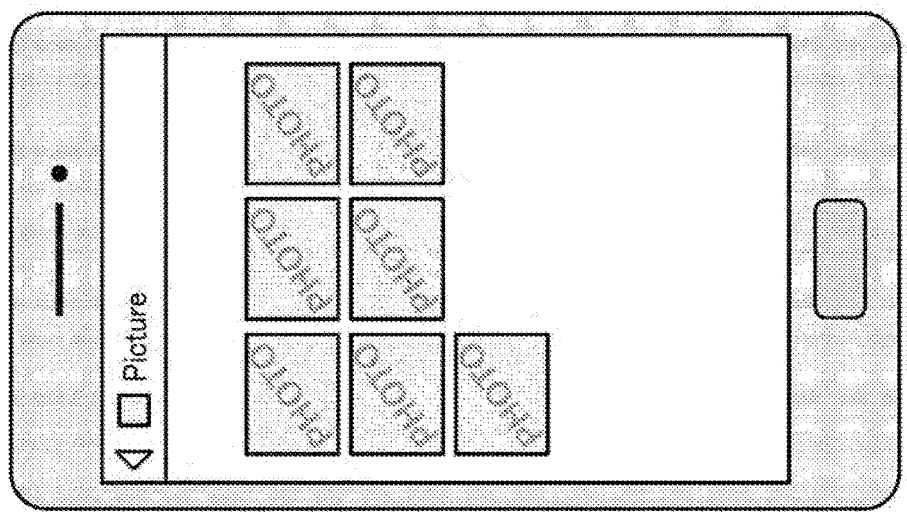
Figure 5A:
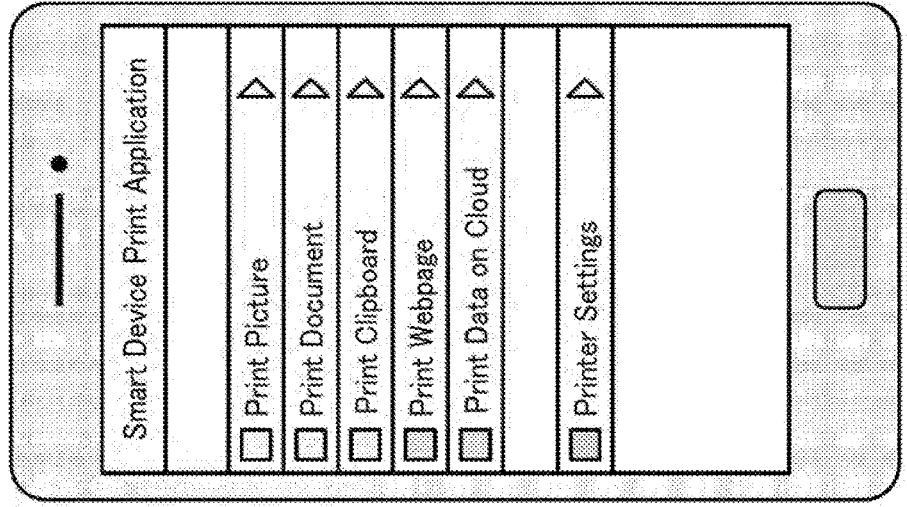

At S101, the print job generator 110 controls the display 30 to display a printer application menu screen, for example, as illustrated in FIG. 5A. As the user selects, from the menu screen, "Print Picture", the smart phone 10 switches to display a picture selection screen as illustrated in FIG. 5B. The picture selection screen of FIG. 5B lists one or more pictures available for selection by the user, for example, from a memory of the smart phone 10. In response to a user selection of a picture to be printed, at S102, the smart phone 10 switches to display a print job acceptance screen, for example, as illustrated in FIG. 5C.

As illustrated in FIG. 5C, with a preview image of the selected picture, the print job acceptance screen displays a "print settings" key to allow the user to set various printing conditions (parameters) for the print job. The print job acceptance screen of FIG. 5C further displays two execution keys, each of which executes the print job when selected by the user: "Print with Default Printer" and "Print via NFC tag".

After displaying the print job acceptance screen of FIG. 5C, at S103, the print job generator 110 waits for a user instruction to execute the print job. In response to the user selection of either one of the execution keys ("YES" at S103), at S104, the print job generator 110 determines whether the user selects the "Print via a NFC tag". When it is determined that the "Print via a NFC tag" is not selected, that is, the "Print with a default device" is selected ("NO" at S104), the operation proceeds to S112. At S112, the print job generator 110 reads, from a memory area managed by the printer application 100, address information (such as an IP address) of the default printer that is previously registered by the user. The print job generator 110 further controls the wireless network I/F 27 to transmit the print job, which is addressed to the obtained IP address, and the operation ends. According to the print job, the default printer prints an image based on the print job received from the smart phone 10.

On the other hand, when the "Print via a NFC tag" is selected ("YES" at S104), the print job generator 110 calls the antenna location finder 120 to cause the antenna location finder 120 to perform S105 to S108.

At S105, the antenna location finder 120 determines whether the antenna location information of the smart phone 10 is stored in the storage area 127. When it is determined that the antenna location information of the smart phone 10 is not stored in the storage area 127 ("NO" at S105), at S106, the antenna location finder 120 performs operation of obtaining the antenna location information, for example, as described below referring to FIG. 6.

Figure 6:
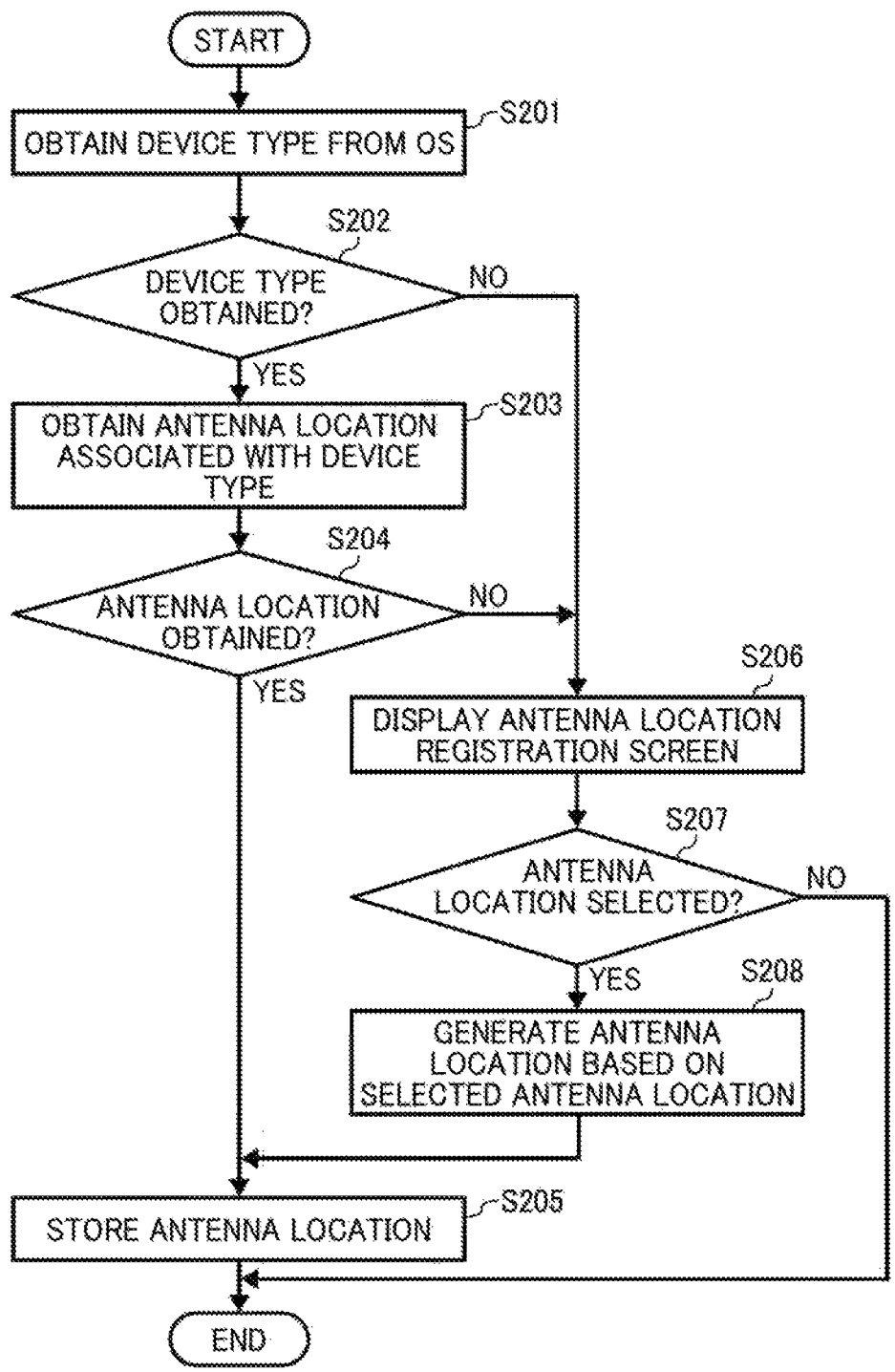
FIG. 6 is a flowchart illustrating operation of obtaining antenna location information, performed by the information processing apparatus of FIG. 1, according to an embodiment of the present invention.

Referring to FIG. 6, operation of obtaining antenna location information, performed by the antenna location finder 120 at S106, is described according to an embodiment of the present invention.

At S201, the device type obtainer 122 obtains, from the OS 130 on the smart phone 10, device type information of the smart phone 10. When the device type information of the smart phone 10 is obtained ("YES" at S202), at S203, the antenna location obtainer 124 obtains antenna location information associated with the obtained device type information, from an antenna location management table 200 managed by the antenna location manager 126.

Figure 7:
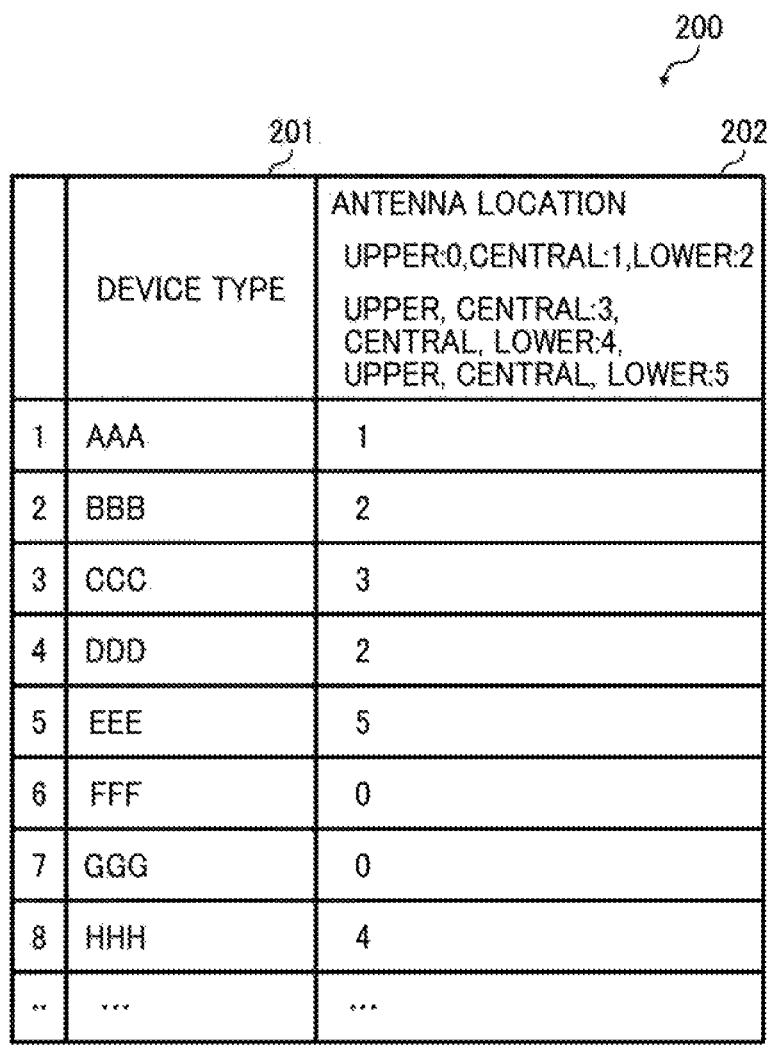
FIG. 7 is an illustration of an example data structure of an antenna location management table.

FIG. 7 illustrates an example data structure of the antenna location management table 200. As illustrated in FIG. 7, the antenna location management table 200 includes a field 201 for storing a device type identifier (device type ID) for identifying a device type of the information processing apparatus provided with the NFC antenna, and a field 202 for storing a location of the NFC antenna ("antenna location") in the information processing apparatus. The device type ID and the antenna location are stored in association for each type of information processing apparatus having the NFC antenna. In this embodiment, the device type ID is stored, however, any other information may be used to identify a device type of the information processing apparatus, such as a model number, machine number, manufacturing number, etc. Further, only a part of such information, such as a part of the model number, may be used to identify the device type.

In this embodiment, the location of the NFC antenna is defined using one or more of three sections including upper section, central section, and lower section, which are respectively obtained by equally dividing a display surface of the smart phone 10 in the longitudinal direction. The antenna location management table 200 stores, for each type of information processing apparatus, the device type ID and the antenna location defined using the upper, central, or lower section.

Figure 8A:
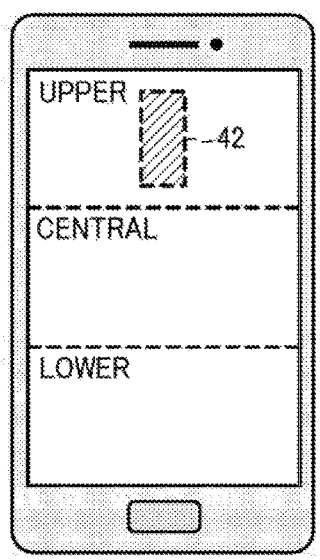
FIGS. 8A to 8F are an illustration for explaining examples of antenna location.
Figure 8B:
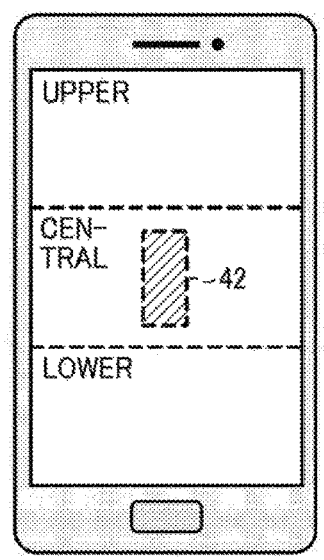
Figure 8C:
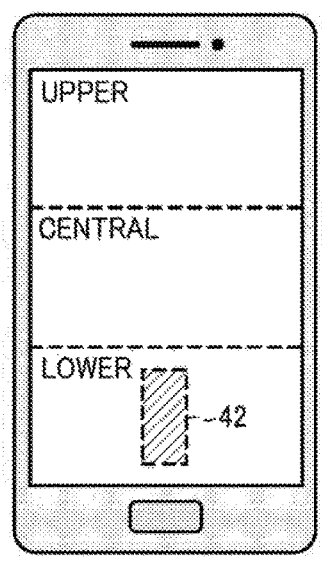

More specifically, as illustrated in FIG. 8A, for the type of information processing apparatus having the NFC antenna 42 located in the upper section, the device type ID identifying such information processing apparatus is associated with "0" indicating the upper section. As illustrated in FIG. 8B, for the type of information processing apparatus having the NFC antenna 42 located in the central section, the device type ID identifying such information processing apparatus is associated with "1" indicating the central section. As illustrated in FIG. 8C, for the type of information processing apparatus having the NFC antenna 42 located in the lower section, the device type ID identifying such information processing apparatus is associated with "2" indicating the lower section.

Figure 8D:
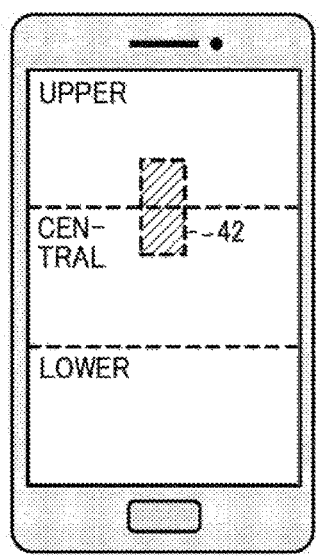
Figure 8E:
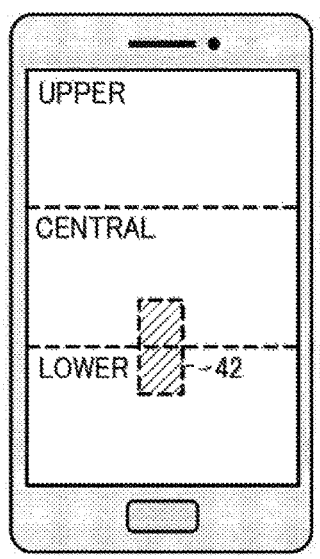
Figure 8F:
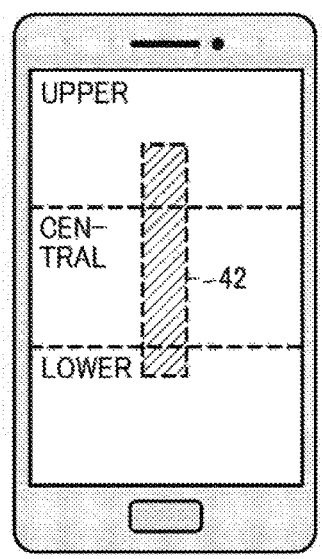

Further, as illustrated in FIG. 8D, for the type of information processing apparatus having the NFC antenna 42 located in a section crossing the upper section and central section, the device type ID identifying such information processing apparatus is associated with "3" indicating the upper and central sections. As illustrated in FIG. 8E, for the type of information processing apparatus having the NFC antenna 42 located in a section crossing the central section and lower section, the device type ID identifying such information processing apparatus is associated with "4" indicating the central and lower sections. As illustrated in FIG. 8F, for the type of information processing apparatus having the NFC antenna 42 located in a section crossing the upper, central, and lower sections, the device type ID identifying such information processing apparatus is associated with "5" indicating the upper, central, and lower sections.

In this embodiment, it is assumed that the antenna location management table 200 is previously stored as a part of the printer application 100. Further, the external server 70 stores an antenna location management table in a memory, which includes antenna location information for each device type as illustrated in FIG. 7. The contents in the antenna location management table may be input or modified, for example, by a provider of the printer application 100. For this reasons, as a new type of device is released, the antenna location management table at the external server 70 is updated to reflect addition of the new device type. However, the antenna location management table 200 that is locally stored in the smart phone 10 would not be automatically updated. Accordingly, if the antenna location obtainer 124 determines that antenna location information is not obtained locally from the antenna location management table 200 in the storage area 127, the antenna location obtainer 124 sends a request for antenna location information to the external server 70.

Alternatively, the printer application 100 may be updated to reflect any update on contents of the antenna location management table, which may be stored at the server 70. In such case, the smart phone 10 may obtain a newer version of the printer application 100 (or a part of the printer application 100 that needs to be added or modified) automatically or according to a user instruction.

As described below, the antenna location management table 200 may be stored at the time of installing the printer application 100, or at the time of configuring after installation of the printer application 100.

Further, more than one type of the antenna location management table 200 may be prepared, for example, depending on a type of the information processing apparatus with non-contact communicable capability. For instance, the antenna location management table for a plurality of types of tablet may be prepared, in addition to the antenna location management table 200 for a plurality of types of smart phone.

Now, operation of obtaining antenna location, which is performed at S201 to S203 of FIG. 6, is described in detail with reference to FIG. 9.

At S1, the antenna location obtainer 124 of the smart phone 10 issues a request for obtaining device type information to the OS 130, to obtain from the OS 130 device type information of the smart phone 10. For simplicity, FIG. 9 illustrates as the antenna location obtainer 124 issues the request, however, as described above referring to FIG. 6, the device type obtainer 122 may send a request for device type to the OS 130.

At S2, the antenna location obtainer 124 issues a request for obtaining antenna location information associated with the obtained device type information to the antenna location manager 126, to obtain from the antenna location management table 200 antenna location information associated with the obtained device type information.

At S2, when the antenna location manager 126 could not find, in the antenna location management table 200, the device type information that is obtained at S1, or the antenna location information associated with the obtained device type information, the operation proceeds to S3. For example, the antenna location management table 200 could be partly or entirely deleted from a local storage area of the smart phone 10, accidentally due to a user instruction, even when the antenna location management table 200 is stored at the time of installing the printer application 100.

At S3, the antenna location obtainer 124 generates a request for obtaining antenna location, which includes the device type information obtained at S1, and sends the request for obtaining to the external server 70 through the network.

At S4, the external server 70 searches the antenna location management table stored in the memory using the received device type information of the smart phone 10 as a search key, to obtain the antenna location information of the smart phone 10, and sends the obtained antenna location to the smart phone 10.

Referring back to FIG. 6, at S204, the antenna location obtainer 124 determines whether the antenna location information of the smart phone 10, which is associated with the device type information obtained at S201, is obtained at S203 either from the antenna location manager 126 or the external server 70. When it is determined that the antenna location information is obtained ("YES" at S204), the operation proceeds to S205. At S205, the antenna location obtainer 124 stores in the storage area 127 the obtained antenna location information in association with the obtained device type, and the operation ends.

When the device type information is not obtained from the OS 130 at S201 ("NO" at S202), or the antenna location information is not obtained either from the antenna location manager 126 or the external server 70 at S203 ("NO" at S204), the antenna location obtainer 124 calls the antenna location registrar 128 to perform S206 to S208.

Figure 10C:
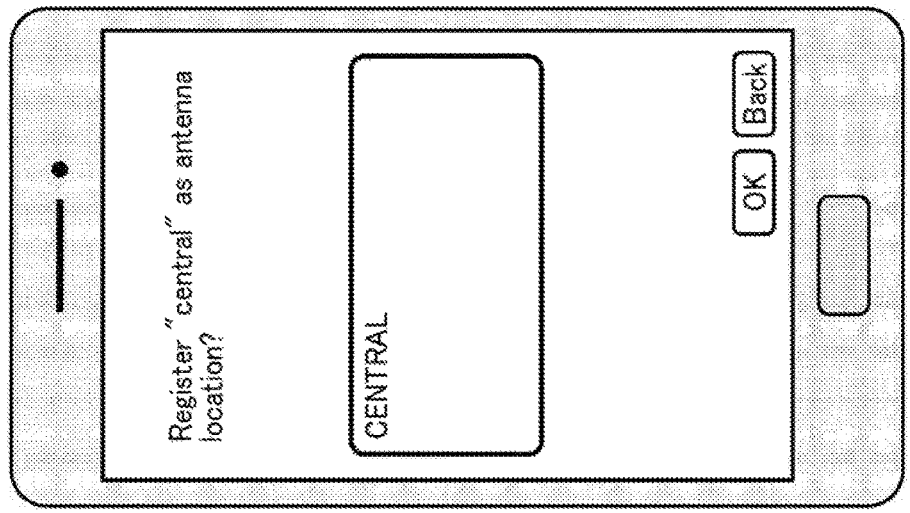
FIGS. 10A to 10C are an illustration of example screens displayed at the information processing apparatus in registering an antenna location.
Figure 10B:
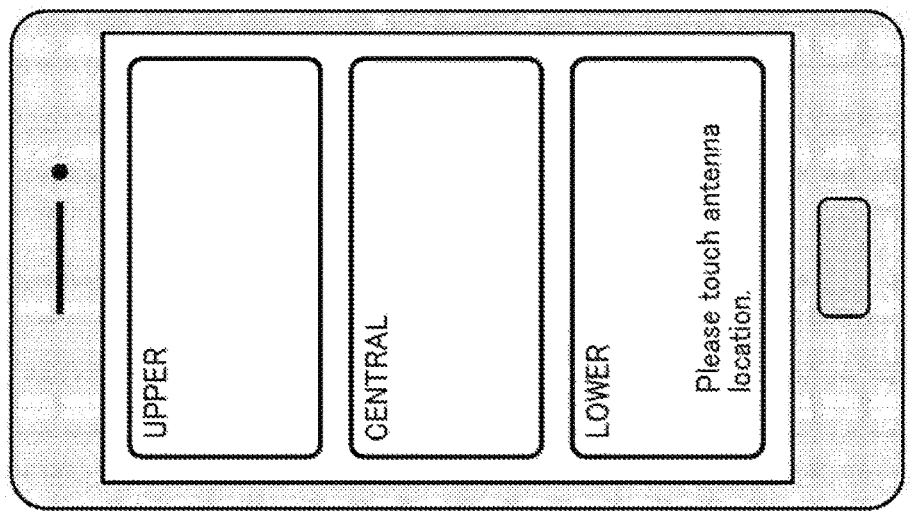
Figure 10A:
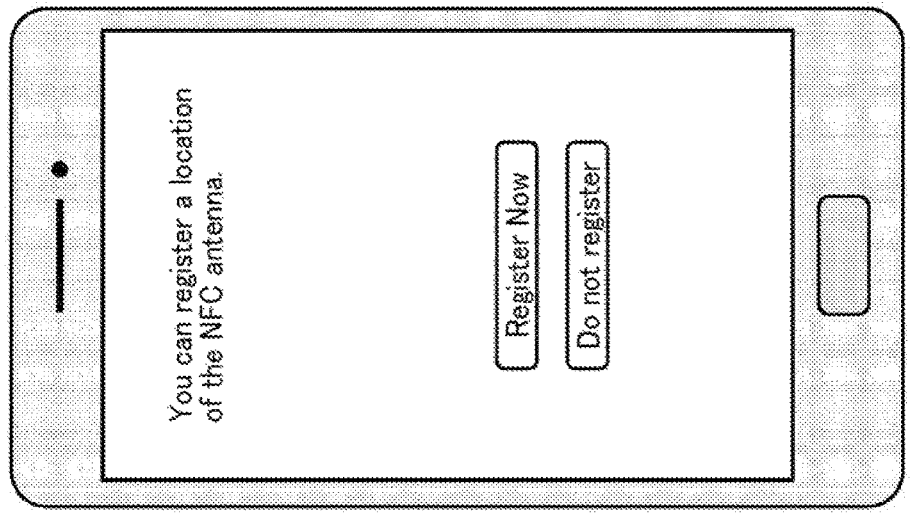

At S206, the antenna location registrar 128 causes the display 30 to display an antenna location registration screen, for example, as illustrated in FIG. 10A.

As illustrated in FIG. 10A, the antenna location registration screen includes a message "You can register a location of the NFC antenna", a "Register now" key, and a "Do not register" key. In response to selection of the "Register now" key, the smart phone 10 switches to an antenna location selection screen illustrated in FIG. 10B.

The antenna location selection screen of FIG. 10B includes a message "Please touch a location of the antenna", and location guide information showing locations of three sections including upper, central, and lower sections. These three sections are obtained by equally dividing the display surface of the display 30 as described above referring to FIGS. 8A to 8F. Further, one or more of these three sections may be selected by the user at a time. The user can then refer to a specification of the smart phone 10, to select one or more of the displayed sections as a location of the NFC antenna 42 of the smart phone 10. In response to selection of the displayed sections, the smart phone 10 switches to display an antenna location confirmation screen, for example, as illustrated in FIG. 10C. The antenna location confirmation screen of FIG. 10C illustrates an example screen, when the user selects the central section as a location of the antenna 42.

As the user selects the "OK" key on the antenna location confirmation screen, at S207, the antenna location registrar 128 determines that the antenna location is selected ("YES" at S207), and the operation proceeds to S208. At S208, the antenna location registrar 128 generates antenna location information of the smart phone 10, based on the one or more sections selected by the user as an antenna location. For example, when the user selects the central section on the antenna location selection screen of FIG. 10B, the antenna location registrar 128 generates the value "1" as the antenna location information. In another example, when the user selects all of the three upper, central, and lower sections at once, the antenna location registrar 128 generates the value "5" as the antenna location information.

After generation of the antenna location information, the operation proceeds to S205. At S205, the antenna location obtainer 124 stores the antenna location information, which is generated at S208, in the storage area 127, and the operation ends.

When the user selects the "Do not register" key on the antenna location registration screen of FIG. 10A, at S207, the antenna location registrar 128 determines that the antenna location is not selected ("NO" at S207), and the operation ends without storing any antenna location information in the storage area 127.

After completion of operation of obtaining antenna location information as described above referring to FIG. 6, the operation further proceeds to S107 of FIG. 4.

Referring back to FIG. 4, when the antenna location information has been stored in the storage area 127 ("YES" at S107 or "YES" at S105), the operation proceeds to S108. At S108, the location guide display 125 generates location guide information based on the obtained antenna location information. At S109, the location guide display 125 causes the display 30 to display the guide location information.

In this disclosure, the location guide information is any information that can assist the user in finding the location of the NFC antenna 42 in the smart phone 10. The location guide information may be expressed in any desired form, for example, in the form of character, symbol, figure, or image, or any combination thereof, using any color. In this embodiment, to help the user to instantly recognize the location of the NFC antenna 42, the location guide information is displayed in the form of a figure on one or more sections that are registered as the antenna location information in the storage area 127.

Figure 11A:
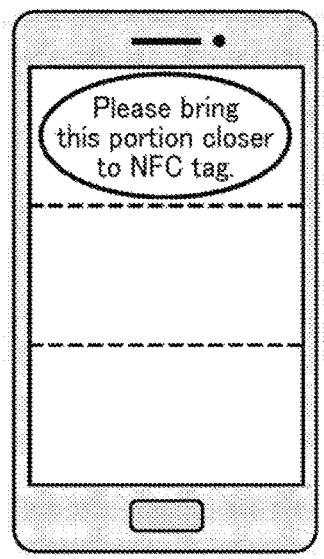
FIGS. 11A to 11F are an illustration of example screens displayed at the information processing apparatus in displaying location guide information.
Figure 11B:
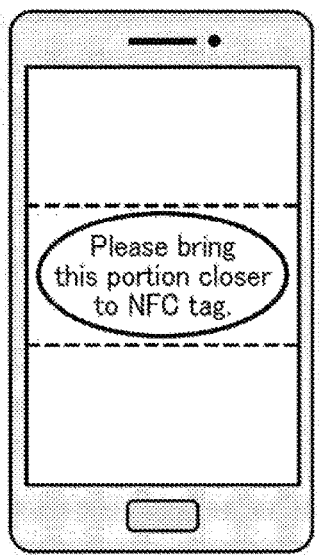
Figure 11C:
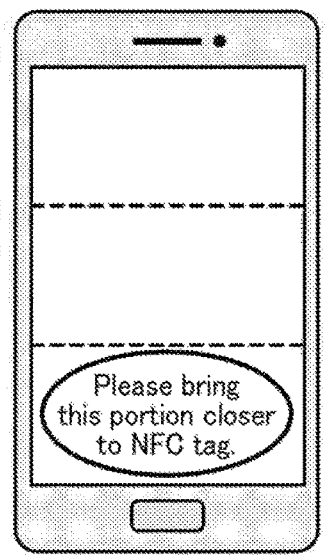

More specifically, as illustrated in FIG. 11A, when the antenna location information "0" is obtained, the location guide display 125 displays, on the upper section on the display surface of the smart phone 10, a semi-circle with a message "Please bring this part (portion) closer to a NFC tag". As illustrated in FIG. 11B, when the antenna location information "1" is obtained, the location guide display 125 displays, on the central section on the display surface of the smart phone 10, a semi-circle with a message "Please bring this part closer to a NFC tag". Similarly, as illustrated in FIG. 11C, when the antenna location information "2" is obtained, the location guide display 125 displays, on the lower section on the display surface of the smart phone 10, a semi-circle with the same message.

Figure 11D:
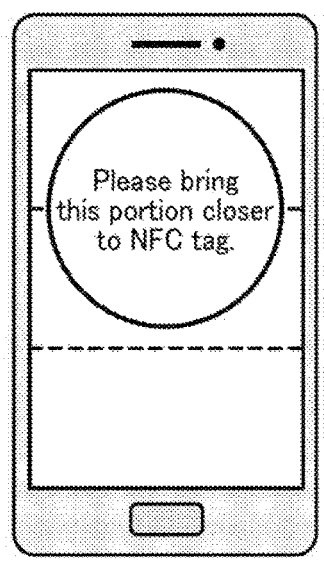
Figure 11E:
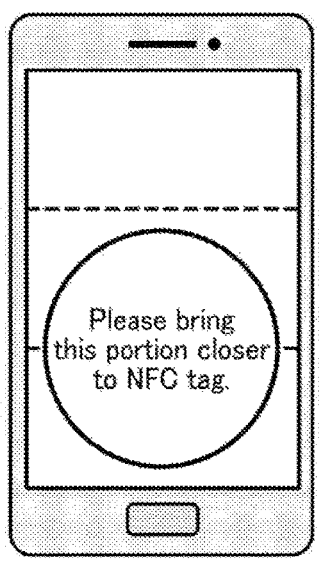
Figure 11F:
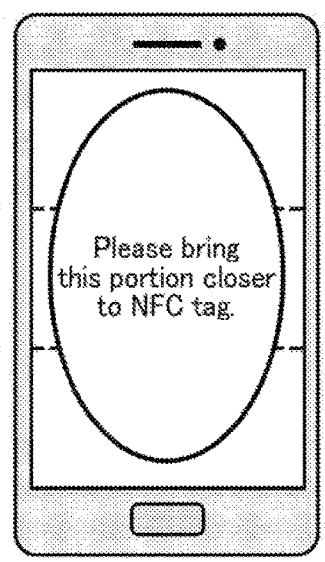

Moreover, as illustrated in FIG. 11D, when the antenna location information "3" is obtained, the location guide display 125 displays, on the upper and central sections, a semi-circle with the same message. As illustrated in FIG. 11E, when the antenna location information "4" is obtained, the location guide display 125 displays, on the central and lower sections, a semi-circle with the same message. As illustrated in FIG. 11F, when the antenna location information "5" is obtained, the location guide display 125 displays, on the upper, central, and lower sections, a semi-circle with the same message.

The semi-circle illustrated in any one of FIGS. 11A to 11F is just exemplary of a geographical image of the location guide information, such that its appearance is not limited to this example. Further, according to a user instruction, the smart phone 10 may freely download, from a dedicated site, a graphical component to be used for displaying location guide information.

In this example, the smart phone 10 may generate screen data, which causes the display 30 to display the location guide information, such as a message, on a section of the display area of the smart phone 10 that corresponds to the antenna location indicated by the antenna location information stored in the storage area 127. The generated screen data may be stored in the storage area 127 to be displayed at any time, in response to a request for displaying the location guide information.

Alternatively, the server 70 may generate and send screen data for display, in response to a request for antenna location information from the smart phone 10.

Referring back to FIG. 4, at S110, the print job generator 110 waits for destination information to be transmitted from the NFC tag 60 of the printer 50.

When the antenna location information is not obtained at S106 ("NO" at S107), the operation proceeds to S110 to wait for destination information to be transmitted from the NFC lag 60 of the printer 50.

As the user brings the smart phone 10 closer to the NFC tag 60 of the printer 50, the NFC antenna 42 of the smart phone 10 is brought closer to the NFC antenna of the NFC tag 60 to establish non-contact communication. At this time, it is assumed that the user refers to the location guide information displayed on the display 30 to determine a section of the smart phone 10 to be brought closer to the NFC tag 60.

Through the non-contact communication established between the smart phone 10 and the printer 50, the print job generator 110 receives an IP address of the printer 50, which is one example of destination information, from the NFC tag 60. When the IP address is obtained from the NFC tag of the printer 50 "YES" at S110), the operation proceeds to S111. At S111, the print job generator 110 sends a print job addressed to the obtained IP address, to cause the printer 50 to print an image based on the print job.

As the print job is being transmitted to the printer 30, the smart phone 10 displays a screen illustrated in FIG. 5D, to notify the user of the currently-performed process of transmitting the print job. As transmission of the print job finishes, the smart phone 10 displays a screen illustrated in FIG. 5E, and the operation ends. According to the print job being transmitted, the printer 50 outputs a printed sheet.

Referring back to S107, when the antenna location information is not obtained at S106 ("NO" at S107), the operation proceeds to S113 to cause the display 30 to display location guide information, which requests the user at the smart phone 10 to establish a connection with the NFC tag 60. FIG. 5F illustrates an example screen including such location guide information, which is to be displayed at S113. The screen of FIG. 5F just includes a message "Please touch the NFC tag", without providing antenna location information. As the user brings the smart phone 10 closer to the NFC tag 60, attached to the printer 50, the operation proceeds to S110 and S111.

The above-described operation of obtaining antenna location is performed, for example, when the user activates the printer application 100 installed on the smart phone 10 for the first time.

Figure 12:
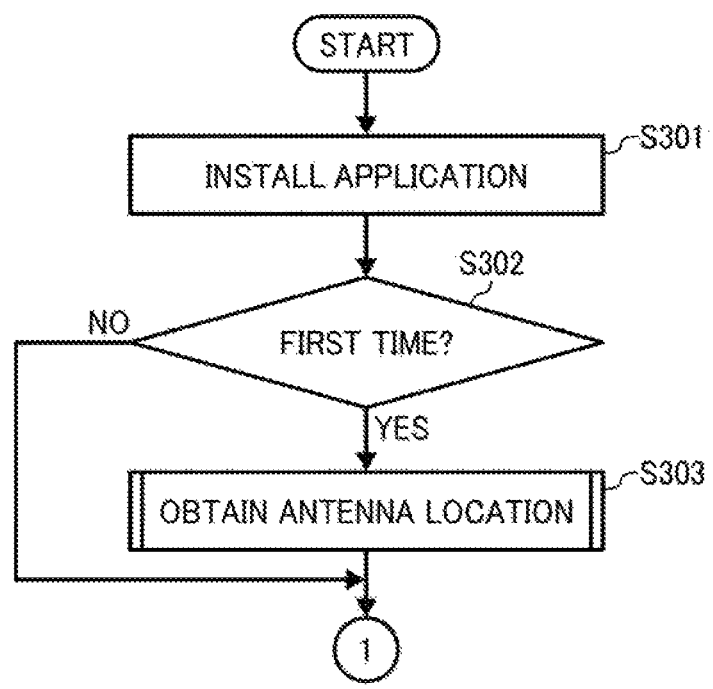
FIG. 12 is a flowchart illustrating operation of installing the printer application, performed by the information processing apparatus of FIG. 1, according to an embodiment of the present invention.

Referring now to FIG. 12, operation of obtaining antenna location at the time of activating the printer application 100 for the First time is described according to an embodiment.

Figure 13B:
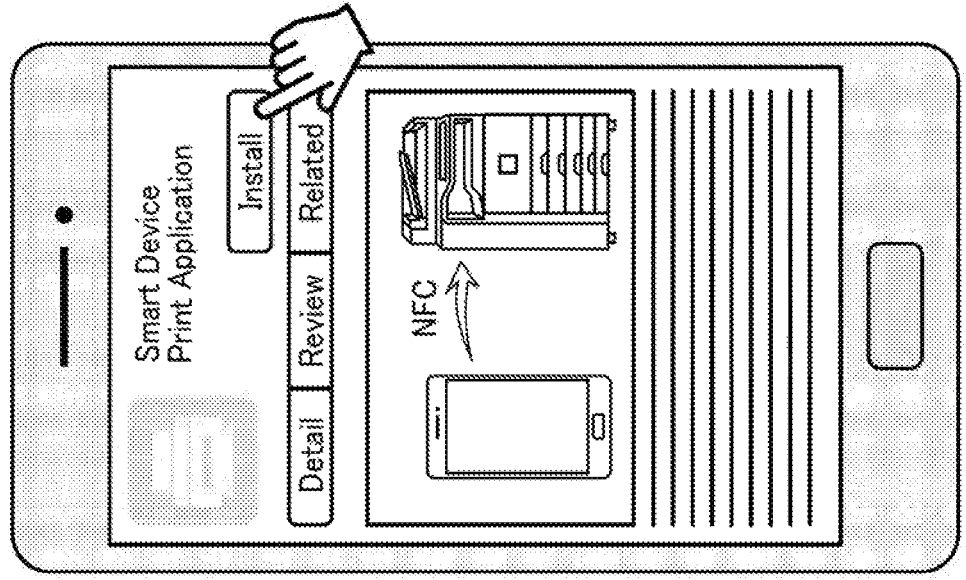
FIGS. 13A to 13D are an illustration of example screens displayed at the information processing apparatus in installing the printer application.
Figure 13A:
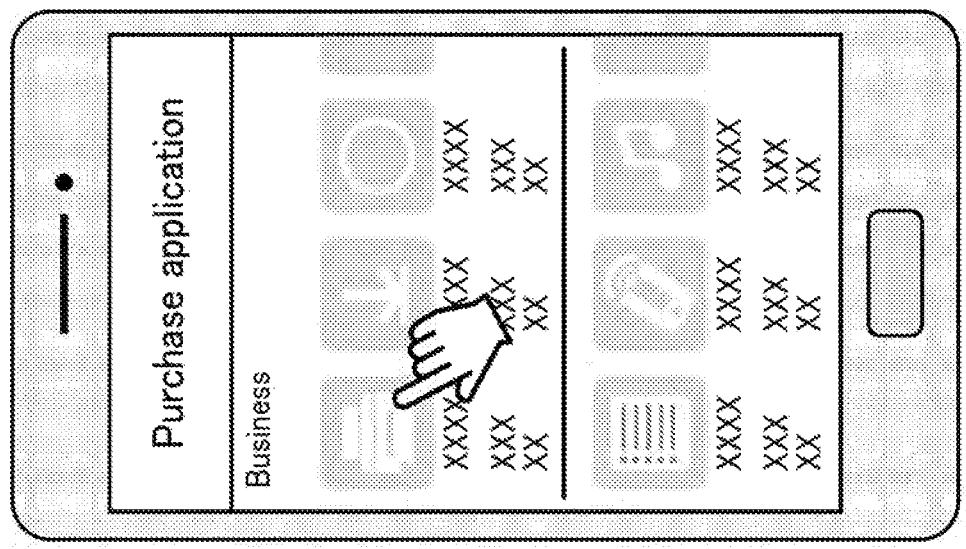

As illustrated in FIG. 13A, as the user selects an icon of the printer application 100 ("smart device print application") from an application purchase screen, the smart phone 10 switches to display a screen illustrated in FIG. 13B with the "Install" key. In response to user selection of the "Install" key, at S301 of FIG. 12, the smart phone 10 downloads the printer application 100 from a server, and installs the downloaded printer application 100 under control of the OS 130. The smart phone 10 then switches to display a screen illustrated in FIG. 13C with the "Activate" key. In response to user selection of the "Activate" key, the processor 22 of the smart phone 10 activates the printer application 100. At S302, the processor 22 determines whether the printer application 100 is activated for the First time. When the printer application 100 is not activated for the first time ("NO" at S302), the operation ends to proceed to S101 of FIG. 4.

Figure 13D:
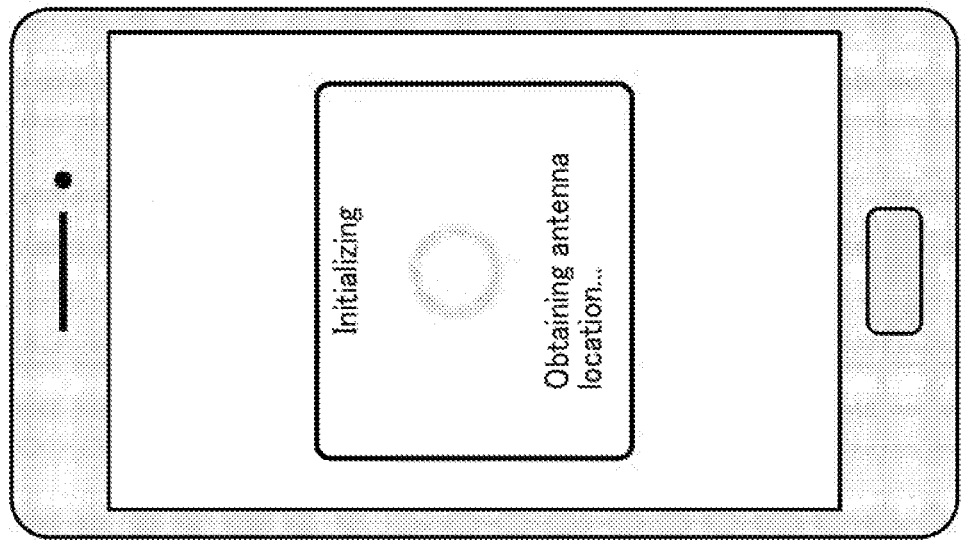
Figure 13C:
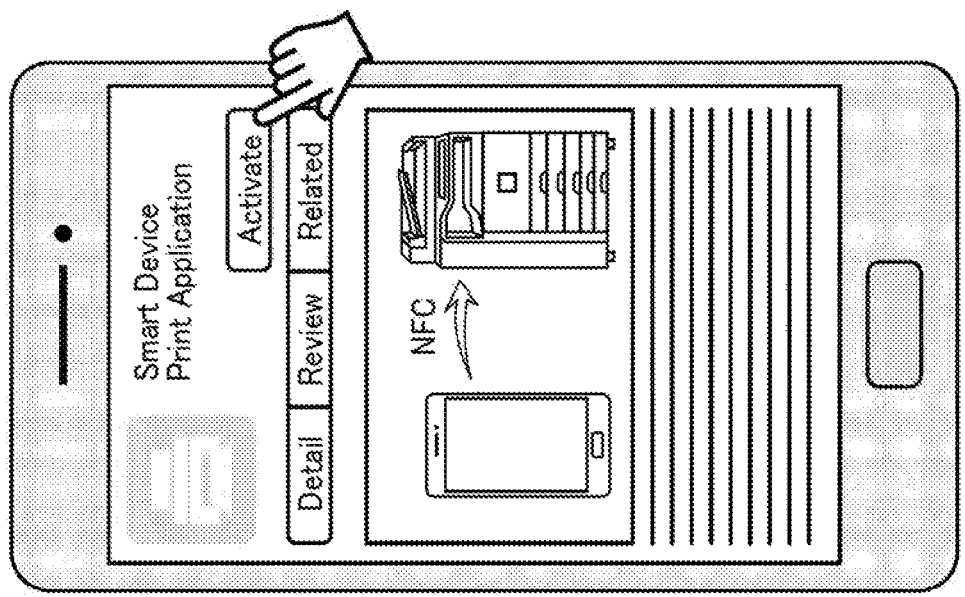

When the printer application 100 is activated for the first time ("YES" at S302), the operation proceeds to S303 to perform operation of obtaining antenna location as described above referring to FIG. 6. While S201 to S203 are being performed, the smart phone 10 displays a screen as illustrated in FIG. 13D.

When the device type obtainer 122 obtains device type information from the OS 130 (S201, "YES" at S202), and the antenna location obtainer 124 obtains the antenna location (S203. "YES" at S204), the antenna location obtainer 124 stores the antenna location in the storage area 127 (S205) to proceed to FIG. 4.

On the other hand, when the device type is not obtained ("NO" at S202), or the antenna location is not obtained ("NO" at S204), the antenna location registrar 128 causes the display 30 to display an antenna location registration screen (S206). When the antenna location is selected by the user ("YES" at S208), and the antenna location information is generated (S208), the antenna location obtainer 124 stores the antenna location information (S205), to proceed to S106 of FIG. 4.

When the user does not select antenna location ("NO" at S207), the operation of obtaining antenna location ends to proceed to S106 of FIG. 4.

As described above according to the present embodiment, the smart phone 10 causes the display 30 to display location guide information that assists the user in finding the location of the NFC antenna 42. With this location guide information, the user is able to bring a section of the smart phone 10, which is indicated as having the NFC antenna 42, closer to the NFC tag 60 of the printer 50 to facilitate establishment of non-contact communication between the smart phone 10 and the NFC tag 60 of the printer 50.

In the above-described embodiment, the antenna location is defined using three sections of the smart phone 10, which are obtained by equally dividing the display surface in the longitudinal direction. However, the antenna location may be defined using, for example, any number of sections of the smart phone 10 that may be determined based on an install location of the antenna 42.

In the above-described embodiment, the antenna location finder 120 is implemented as a module of the printer application 100. However, the antenna location finder 120 may be embedded into any desired application other than the printer application 100. For example, the antenna location finder 120 may be embedded with an output device management application that controls transmission of data to the output device, to cause the data to be output through the output device. In such case, the location guide information is displayed, when the smart phone 10 is about to establish a communication with the output device. Examples of output device include, but not limited to, a projector and an electronic whiteboard.

In another example, the antenna location finder 120 may be embedded with an electronic payment application, which causes the smart phone 10 to display location guide information when activated. With the location guide information, the user brings the antenna location of the smart phone 10 closer to a NFC reader, which is provided for a cashing machine, to settle payment.

In another example, the antenna location finder 120 may be embedded with a public service application, which causes the smart phone 10 to display location guide information when activated. With the location guide information, the user brings the antenna location of the smart phone 10 closer to a NFC reader, which is provided for an authentication server to perform login process, to send user account information to the authentication server.

In another example, the antenna location finder 120 may be embedded with a point charge application, which causes the smart phone 10 to display location guide information when activated. With the location guide information, the user brings the antenna location of the smart phone 10 closer to a NFC reader, which is provided for a point charge management server to manage the points accumulated by each user, to send point information to the point charge management server.

Alternatively, instead of implementing the antenna location finder 120 to be called with activation of other application such as the print job generator 110, the antenna location finder 120 may be implemented as an application program that independently operates to be installed onto any desired information processing apparatus.

Moreover, any information processing apparatus, which can be carried by the user, can be installed with the control program functioning as the antenna location finder 120, such as any mobile terminal, portable terminal, or wearable terminal. Examples of such information processing apparatus, or a terminal carried by the user, include, but not limited to, a smart phone, table, digital camera, personal assistant device, smart watch, smart glasses, game machine, and remote controller.

Any one of the above-described functions or operations may be implemented as a computer executable program, described with a description language such as C, C++, C#, and Java. Such program may be stored in any desired memory such as a hard disk, a recording medium such as a CD-ROM, MO, DVD, flexible disc, EEPROM, EPROM, etc. for distribution. Further, such program may be transmitted through a network to other information processing apparatus to be executed by the other information processing apparatus.

The above-described embodiments are illustrative and do not limit the present invention. Thus, numerous additional modifications and variations are possible in light of the above teachings. For example, elements and or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gale array (FPGA), and conventional circuit components arranged to perform the recited functions.

The invention claimed is:

1. A method of controlling display of a communication terminal, the method comprising:

receiving, from a user carrying and operating the communication terminal, an instruction that causes the communication terminal to establish a non-contact communication with a counterpart communication device, which is an image forming apparatus that includes at least a printing function, via an antenna provided in the communication terminal; and controlling, via a printing application installed on the communication terminal and in response to a selection by the user within the printing application to instruct the counterpart communication device to perform a printing operation via the non-contact communication, a display of the communication terminal to display location guide information indicating a location of the antenna in the communication terminal, the location guide information to be used for assisting the user in identifying a section of the communication terminal to be brought closer to the counterpart communication device to start establishing the non-contact communication with the counterpart communication device, wherein the method further includes storing, for each device type of a plurality of communication terminals with non-contact communication capability, association information that associates antenna location information indicating a location of an antenna in the communication terminal, with device type information indicating the device type;

obtaining device type information identifying a device type of the communication terminal operated by the user, from an operating system installed on the communication terminal operated by the user;

obtaining, from the association information, antenna location information associated with the obtained device type information; and generating the location guide information based on the obtained antenna location information.

2. The method of claim 1, wherein the step of obtaining antenna location information includes:

determining whether the antenna location information is obtained from a local memory of the communication terminal, the local memory storing the association information;

sending a request for antenna location information associated with the obtained device type information, to a server through a network, based on a determination indicating that the antenna location information is not obtained from the local memory; and storing antenna location information received from the server, as the obtained antenna location information in the local memory.

3. The method of claim 1, wherein the step of obtaining antenna location information includes:

sending a request for antenna location information associated with the obtained device type information, to a server through a network, the server including a memory that stores the association information; and storing antenna location information received from the server, as the obtained antenna location information in a local memory of the communication terminal.

4. The method of claim 1, wherein the location of the antenna is defined by one or more of a plurality of divided sections of a display area of the display of the communication terminal, and the location guide information is displayed at one or more of the plurality of divided sections of the display area of the display, which correspond to the location of the antenna that is indicated by the obtained antenna location information.

5. The method of claim 4, wherein, when the location of the antenna extends two or more of the plurality of divided sections of the display area of the display, the location guide information is displayed at two or more of the plurality of divided sections of the display area of the display, which correspond to the location of the antenna extending two or more of the plurality of divided sections.

6. The method of claim 1, further comprising:

installing the printer application for controlling display of the location guide information at the communication terminal, wherein the step of obtaining device type information and the step of obtaining antenna location information are performed when the printer application is activated for the first time after installation.

7. The method of claim 6, further comprising:

requesting the user operating the communication terminal to input antenna location information, when none of the device type information and the antenna location information is obtained.

8. The method of claim 7, further comprising:

wherein the step of requesting the user to input is performed when the printer application is activated for the first time after installation.

9. A communication terminal, comprising:

an antenna;

processing circuitry to receive, from a user carrying and operating the communication terminal, an instruction that causes the communication terminal to establish a non-contact communication with a counterpart communication device, which is an image forming apparatus that includes at least a printing function, via the antenna provided in the communication terminal; and a display to display location guide information, via a printing application installed on the communication terminal and in response to a selection by the user within the printing application to instruct the counterpart communication device to perform a printing operation via the non-contact communication, indicating a location of the antenna in the communication terminal, the location guide information to be used for assisting the user in identifying a section of the communication terminal to be brought closer to the counterpart communication device to start establishing the non-contact communication with the counterpart communication device, wherein the processing circuitry is further configured to:

obtain device type information identifying a device type of the communication terminal operated by the user, from an operating system installed on the communication terminal operated by the user;

obtain, from association information, antenna location information associated with the obtained device type information, the association information associating, for each device type of a plurality of communication terminals with non-contact communication capability, antenna location information indicating a location of an antenna in the communication terminal, with device type information indicating the device type; and generate the location guide information based on the obtained antenna location information.

10. The communication terminal of claim 9, further comprising:

a memory to store the association information; and a network interface to communicate with a server through a network, wherein the processing circuitry is further configured to:

determine whether the antenna location information is obtained from the memory of the communication terminal;

send a request for antenna location information associated with the obtained device type information, to the server through the network, based on a determination indicating that the antenna location information is not obtained from the local memory; and store antenna location information received from the server, as the obtained antenna location information in the memory.

11. The communication terminal of claim 9, further comprising:
a network interface to send a request for antenna location information associated with the obtained device type information, to a server through a network, the server including a memory that stores the association information; and
a local memory to store antenna location information received from the server, as the obtained antenna location information.

12. A system, comprising:
the communication terminal of claim 9; and
an output apparatus provided with the counterpart communication device,
wherein the communication terminal starts communication with the output apparatus using information obtained through the non-contact communication established with the counterpart communication device.

13. A system, comprising:
the communication terminal of claim 9; and
a server to connect with the communication terminal through a network, the server including:
a memory to store association information that associates, for each device type of a plurality of communication terminals with non-contact communication capability, antenna location information indicating a location of an antenna in the communication terminal, with device type information indicating the device type; and
a network interface to send, to the communication terminal, antenna location information associated with device type information identifying a device type of the communication terminal.

14. A non-transitory recording medium which, when executed by one or more processors, cause the processors to perform a method of controlling display of a communication terminal, the method comprising:
receiving, from a user carrying and operating the communication terminal, an instruction that causes the communication terminal to establish a non-contact communication with a counterpart communication device, which is an image forming apparatus that includes at least a printing function, via an antenna provided in the communication terminal; and
controlling, via a printing application installed on the communication terminal and in response to a selection by the user within the printing application to instruct the counterpart communication device to perform a printing operation via the non-contact communication, a display of the communication terminal to display location guide information indicating a location of the antenna in the communication terminal, the location guide information to be used for assisting the user in identifying a section of the communication terminal to be brought closer to the counterpart communication device to start establishing the non-contact communication with the counterpart communication device,
wherein the method further includes
storing, for each device type of a plurality of communication terminals with non-contact communication capability, association information that associates antenna location information indicating a location of an antenna in the communication terminal, with device type information indicating the device type;
obtaining device type information identifying a device type of the communication terminal operated by the user, from an operating system installed on the communication terminal operated by the user;
obtaining, from the association information, antenna location information associated with the obtained device type information; and
generating the location guide information based on the obtained antenna location information.

* * * * *